US008543584B2

(12) United States Patent
Vadon et al.

(10) Patent No.: US 8,543,584 B2
(45) Date of Patent: Sep. 24, 2013

(54) DETECTION OF BEHAVIOR-BASED ASSOCIATIONS BETWEEN SEARCH STRINGS AND ITEMS

(75) Inventors: Eric R. Vadon, Seattle, WA (US); Ronald M. Whitman, Seattle, WA (US); Ron Kohavi, Issaquah, WA (US); Gautam K. Jayaraman, Seattle, WA (US); Benjamin W. S. Redman, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 0 days.

(21) Appl. No.: 13/367,134

(22) Filed: Feb. 6, 2012
(Under 37 CFR 1.47)

(65) Prior Publication Data
US 2012/0143840 A1   Jun. 7, 2012

Related U.S. Application Data

(63) Continuation of application No. 13/082,931, filed on Apr. 8, 2011, now Pat. No. 8,112,429, which is a continuation of application No. 11/276,079, filed on Feb. 13, 2006, now Pat. No. 7,953,740.

(51) Int. Cl.
*G06F 17/30* (2006.01)
(52) U.S. Cl.
USPC ........................................................ 707/751
(58) Field of Classification Search
None
See application file for complete search history.

(56) References Cited

U.S. PATENT DOCUMENTS

| 5,278,980 | A  | 1/1994  | Pedersen et al. |
| 5,657,450 | A  | 8/1997  | Rao et al. |
| 5,694,592 | A  | 12/1997 | Driscoll |
| 6,006,225 | A  | 12/1999 | Bowman et al. |
| 6,065,001 | A  | 5/2000  | Ohkubo et al. |
| 6,098,065 | A  | 8/2000  | Skillen et al. |
| 6,173,280 | B1 | 1/2001  | Ramkumar et al. |
| 6,185,558 | B1 | 2/2001  | Bowman |
| 6,195,654 | B1 | 2/2001  | Wachtel |
| 6,363,378 | B1 | 3/2002  | Conklin et al. |
| 6,366,910 | B1 | 4/2002  | Rajaraman et al. |
| 6,421,675 | B1 | 7/2002  | Ryan et al. |

(Continued)

FOREIGN PATENT DOCUMENTS

| WO | WO0116806 | 3/2001 |
| WO | WO0146870 | 6/2001 |

OTHER PUBLICATIONS

Joachims, Thorsten, "Optimizing Search Engines using Clickthrough Data," Proceedings of the 8th ACM SIGKDD international conference on knowledge discovery and data mining, ACM Press, pp. 133-142, Jul. 2002.

(Continued)

*Primary Examiner* — Bai D. Vu
(74) *Attorney, Agent, or Firm* — Knobbe, Martens, Olson & Bear LLP

(57) ABSTRACT

A system and method are disclosed for automatically detecting associations between particular sets of search criteria, such as particular search strings, and particular items. Actions of users of an interactive system, such as a web site, are monitored over time to generate event histories reflective of searches, item selection actions, and possibly other types of user actions. An analysis component collectively analyzes the event histories to automatically identify and quantify associations between specific search strings (or other types of search criteria) and specific items.

20 Claims, 10 Drawing Sheets

(56) References Cited

U.S. PATENT DOCUMENTS

| | | |
|---|---|---|
| 6,430,558 B1 | 8/2002 | Delano |
| 6,502,091 B1 | 12/2002 | Chundi et al. |
| 6,584,462 B2 | 6/2003 | Neal et al. |
| 6,606,102 B1 | 8/2003 | Odom |
| 6,665,655 B1 | 12/2003 | Warner et al. |
| 6,671,681 B1 * | 12/2003 | Emens et al. .......... 707/706 |
| 6,691,163 B1 | 2/2004 | Tuffts |
| 6,732,088 B1 | 5/2004 | Glance |
| 6,732,090 B2 | 5/2004 | Shanahan et al. |
| 6,757,682 B1 | 6/2004 | Naimark et al. |
| 6,772,150 B1 | 8/2004 | Whitman et al. |
| 6,778,979 B2 | 8/2004 | Grefenstette et al. |
| 6,785,671 B1 | 8/2004 | Bailey et al. |
| 6,801,909 B2 | 10/2004 | Delgado et al. |
| 7,089,237 B2 | 8/2006 | Turnbull et al. |
| 7,152,061 B2 | 12/2006 | Curtis et al. |
| 7,162,454 B1 | 1/2007 | Donner et al. |
| 7,194,454 B2 | 3/2007 | Hansen et al. |
| 7,401,074 B2 * | 7/2008 | Liu et al. .......... 707/767 |
| 7,467,349 B1 | 12/2008 | Bryar et al. |
| 2002/0002502 A1 | 1/2002 | Maes et al. |
| 2002/0019763 A1 | 2/2002 | Linden et al. |
| 2002/0072974 A1 | 6/2002 | Pugliese, III et al. |
| 2002/0078045 A1 | 6/2002 | Dutta |
| 2002/0103789 A1 | 8/2002 | Turnbull et al. |
| 2002/0188694 A1 | 12/2002 | Yu |
| 2002/0194081 A1 | 12/2002 | Perkowski |
| 2002/0198882 A1 | 12/2002 | Linden et al. |
| 2003/0014399 A1 | 1/2003 | Hansen et al. |
| 2003/0061202 A1 | 3/2003 | Coleman |
| 2003/0078928 A1 | 4/2003 | Dorosario et al. |
| 2004/0260677 A1 | 12/2004 | Malpani et al. |
| 2005/0044008 A1 | 2/2005 | Freishtat et al. |
| 2005/0102202 A1 | 5/2005 | Linden et al. |
| 2005/0222987 A1 | 10/2005 | Vadon |
| 2005/0257156 A1 | 11/2005 | Jeske et al. |
| 2007/0038615 A1 | 2/2007 | Vadon et al. |
| 2007/0143266 A1 | 6/2007 | Tang et al. |

OTHER PUBLICATIONS

Liu, F., Yu, C., and Meng, W., "Personalized Web Search by Mapping User Queries to Categories," Proceedings of the 11$^{th}$ International Conference on Information and Knowledge Management, CIKM 2002, McLean, VA, Nov. 4-9, 2002, International Conference on Information Knowledge Management, New York, NY: ACM, dated Nov. 4, 2002, pp. 558-565, XP-002325895.

Peter G. Anick, "Adapting a Full-text Information Retrieval System to the Computer Troubleshooting Domain," Proceedings of the 17$^{th}$ annual international ACM SIGIR conference on research and development in information retrieval, pp. 349-358, 1994.

Preetha Appan and Hari Sundaram, Networked Multimedia Event Exploration, MM'04, Oct. 16, 2004, New York, New York, US.

Radlinski, Filip, et al., "Query Chains: Learning to Rank from Implicit Feedback," Proceedings of the 11$^{th}$ ACM SIGKDD international conference on knowledge discovery in data mining (KDD '05), ACM Press, pp. 239-248, Aug. 2005.

Wen, Ji-Rong, et al., "Query Clustering Using Content Words and User Feedback," Proceedings of the 24$^{th}$ annual international ACM SIGIR conference on research and development in information retrieval, ACM Press, pp. 442-443, Sep. 2001.

U.S. Appl. No. 10/966,343, filed Oct. 15, 2004.

* cited by examiner

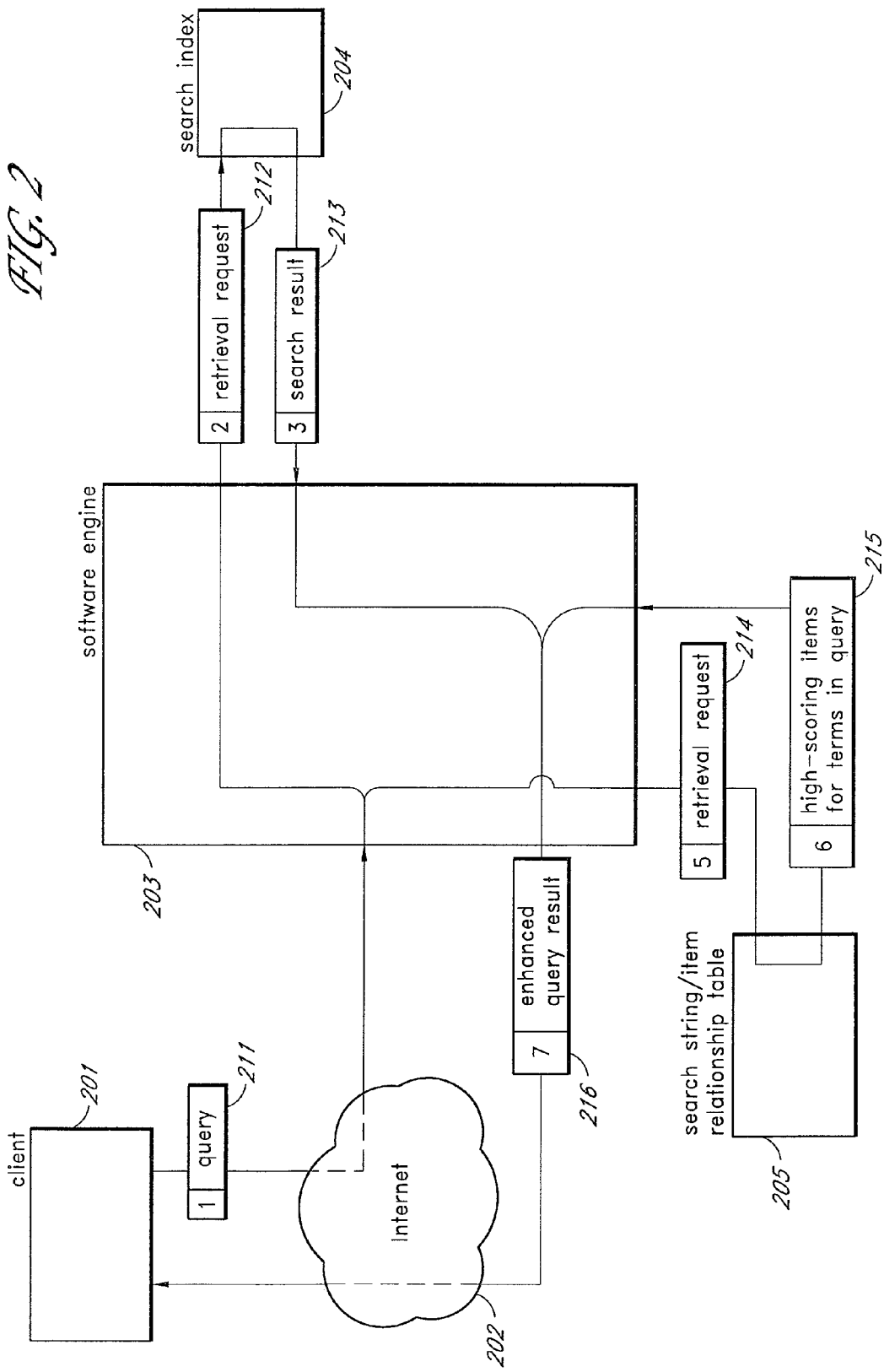

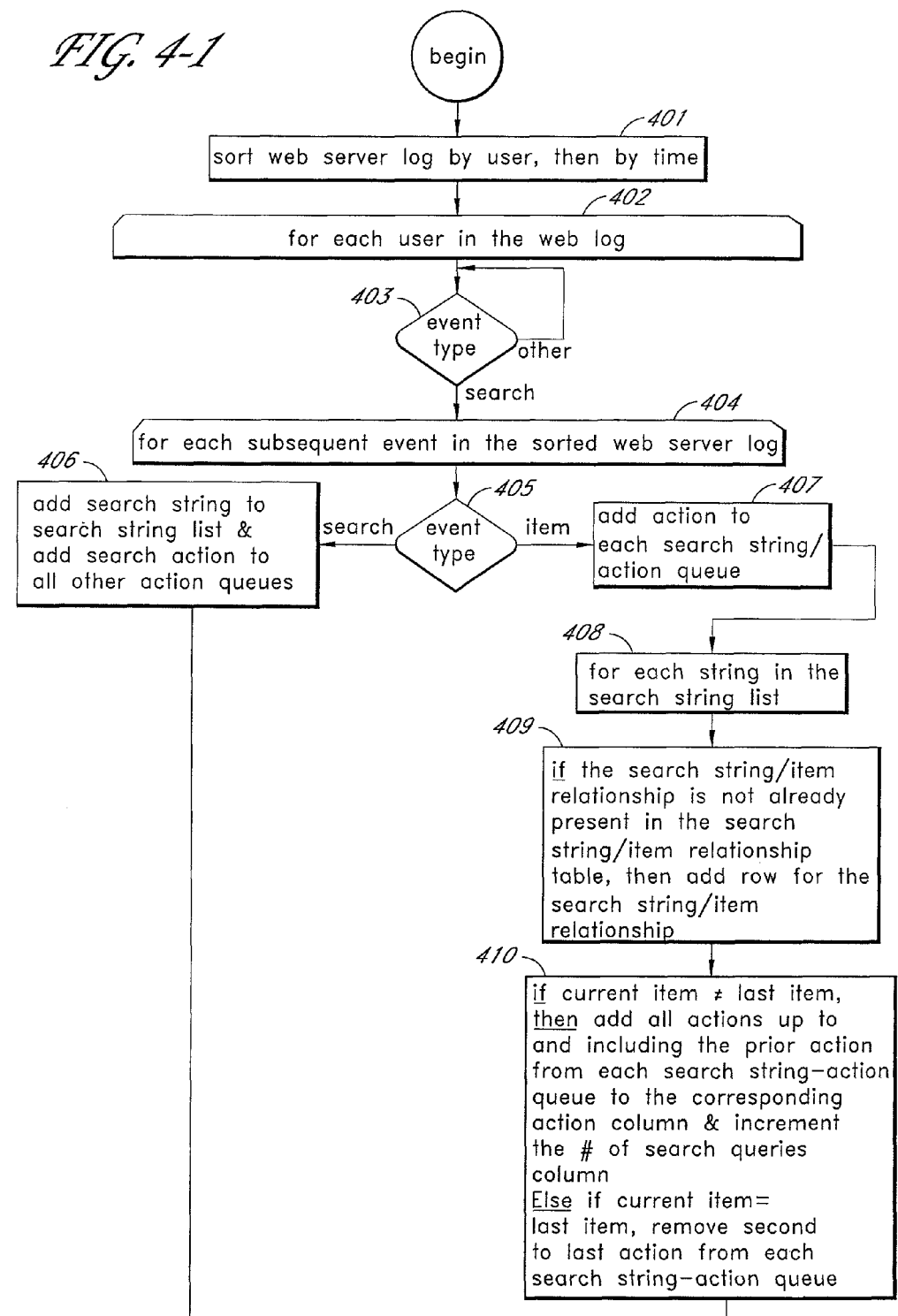

| User | Time | Action Type | Item | Description |
|---|---|---|---|---|
| A | 11:01:09 | VIEW | 28834584 | Apple Desktop |
| B | 11:01:12 | SEARCH | "Apple" | |
| B | 11:01:28 | VIEW | 87142324 | Apple iPod |
| A | 11:02:43 | SEARCH | "Apple" | |
| B | 11:04:56 | CART ADD | 87142324 | Apple iPod |
| A | 11:09:22 | VIEW | 45645549 | Apple iPod shuffle |
| A | 11:10:43 | VIEW | 87142324 | Apple iPod |
| A | 11:11:29 | CART ADD | 87142324 | Apple iPod |
| B | 11:14:35 | VIEW | 28834584 | Apple Desktop |
| A | 11:16:15 | SEARCH | "Spiderman" | |
| A | 11:19:24 | VIEW | 12234208 | Spiderman Soundtrack |
| A | 11:30:45 | PURCHASE | 12234208 | Spiderman Soundtrack |
| A | 11:30:47 | VIEW | 65488210 | Spiderman Movie |

*FIG. 5*

| User | Time | Action Type | Item | Description |
|---|---|---|---|---|
| A | 11:01:09 | VIEW | 28834584 | Apple Desktop |
| A | 11:02:43 | SEARCH | "Apple" | |
| A | 11:09:22 | VIEW | 45645549 | Apple iPod shuffle |
| A | 11:10:43 | VIEW | 87142324 | Apple iPod |
| A | 11:11:29 | CART ADD | 87142324 | Apple iPod |
| A | 11:16:15 | SEARCH | "Spiderman" | |
| A | 11:19:24 | VIEW | 12234208 | Spiderman Soundtrack |
| A | 11:30:45 | PURCHASE | 12234208 | Spiderman Soundtrack |
| A | 11:30:47 | VIEW | 65488210 | Spiderman Movie |
| B | 11:01:12 | SEARCH | "Apple" | |
| B | 11:01:28 | VIEW | 87142324 | Apple iPod |
| B | 11:04:56 | CART ADD | 87142324 | Apple iPod |
| B | 11:14:35 | VIEW | 28834584 | Apple Desktop |

| Search String | Item | Actions | Search String/Item Relationship Value | # of Searches conducted with this relationship | Confidence Interval Value |
|---|---|---|---|---|---|
| "Apple" | 12234208 | | 0 | 0 | 0 |
| "Apple" | 65488210 | | 0.17 | 5 | 0.04 |
| "Apple" | 87142324 | | 0.56 | 654 | 0.54 |
| "Apple" | 45645549 | | 0.81 | 1053 | 0.80 |
| "Apple" | 28834584 | | 0.73 | 521 | 0.71 |
| "Spiderman" | 12234208 | | 0.43 | 955 | 0.41 |
| "Spiderman" | 65488210 | | 0.81 | 786 | 0.80 |

FIG. 8

| Search String | Item | Actions | Search String/Item Relationship Value | # of Searches conducted with this relationship | Confidence Interval Value |
|---|---|---|---|---|---|
| "Apple" | 12234208 | View, Cart Add, Search | 0 | 1 | 0 |
| "Apple" | 65488210 | View, Cart Add, Search, Purchase | 0.17 | 6 | 0.04 |
| "Apple" | 87142324 | View | 0.56 | 655 | 0.54 |
| "Apple" | 45645549 | (None) | 0.81 | 1054 | 0.80 |
| "Apple" | 28834584 | N/A | 0.73 | 521 | 0.71 |
| "Spiderman" | 12234208 | (None) | 0.43 | 956 | 0.41 |
| "Spiderman" | 65488210 | Purchase | 0.81 | 787 | 0.80 |

FIG. 9

| Search String | Item | Actions | Search String/Item Relationship Value | # of Searches conducted with this relationship | Confidence Interval Value |
|---|---|---|---|---|---|
| "Apple" | 12234208 | View, Cart Add, Search (1*0.9*0.7*0.5=0.32) | 0.32 | 1 | 0.11 |
| "Apple" | 65488210 | View, Cart Add, Search, Purchase(1*0.9*0.7*0.5*0=0) | 0.17 | 6 | 0.05 |
| "Apple" | 87142324 | View (1*0.9=0.9) | 0.56 | 655 | 0.54 |
| "Apple" | 45645549 | (None) (1=1) | 0.81 | 1054 | 0.80 |
| "Apple" | 28834584 | (N/A) | 0.73 | 521 | 0.71 |
| "Spiderman" | 12234208 | (None) (1=1) | 0.43 | 956 | 0.41 |
| "Spiderman" | 65488210 | Purchase (1*0=0) | 0.81 | 787 | 0.80 |

FIG. 10

| Search String | Item | Actions | Search String/Item Relationship Value | # of Searches conducted with this relationship | Confidence Interval Value |
|---|---|---|---|---|---|
| "Apple" | 208 | (N/A) | 0.32 | 1 | 0.11 |
| "Apple" | 210 | (N/A) | 0.17 | 6 | 0.05 |
| "Apple" | 324 | (None) (1=1) | 0.56 | 656 | 0.54 |
| "Apple" | 549 | (N/A) | 0.81 | 1054 | 0.80 |
| "Apple" | 584 | Cart Add (1*0.7=0.7) | 0.73 | 522 | 0.71 |
| "Spiderman" | 208 | (N/A) | 0.43 | 956 | 0.41 |
| "Spiderman" | 210 | (N/A) | 0.81 | 787 | 0.80 |

FIG. 11

| Search String | Item | Actions | Search String/Item Relationship Value | # of Searches conducted with this relationship | Confidence Interval Value |
|---|---|---|---|---|---|
| "Apple" | 208 | (N/A) | 0.32 | 1 | 0.11 |
| "Apple" | 210 | (N/A) | 0.17 | 6 | 0.05 |
| "Apple" | 324 | (None) (1=1) | 0.56 | 656 | 0.54 |
| "Apple" | 549 | (N/A) | 0.81 | 1054 | 0.80 |
| "Apple" | 584 | Cart Add (1*0.7=0.7) | 0.73 | 522 | 0.71 |
| "Spiderman" | 208 | (N/A) | 0.43 | 956 | 0.41 |
| "Spiderman" | 210 | (N/A) | 0.81 | 787 | 0.80 |

FIG. 12

| Search String | Item | Actions | Search String/Item Relationship Value | # of Searches conducted with this relationship | Confidence Interval Value |
|---|---|---|---|---|---|
| "Apple" | 208 | | 0.32 | 1 | 0.11 |
| "Apple" | 210 | | 0.17 | 6 | 0.05 |
| "Apple" | 324 | | 0.56 | 656 | 0.54 |
| "Apple" | 549 | | 0.81 | 1054 | 0.80 |
| "Apple" | 584 | | 0.73 | 522 | 0.71 |
| "Spiderman" | 208 | | 0.43 | 956 | 0.41 |
| "Spiderman" | 210 | | 0.81 | 787 | 0.80 |

DETECTION OF BEHAVIOR-BASED ASSOCIATIONS BETWEEN SEARCH STRINGS AND ITEMS

CROSS REFERENCE TO RELATED APPLICATIONS

This application is a continuation of and claims benefit of priority to U.S. patent application Ser. No. 13/082,931, filed Apr. 8, 2011, entitled "DETECTION OF BEHAVIOR-BASED ASSOCIATIONS BETWEEN SEARCH STRINGS AND ITEMS," which is hereby incorporated by reference in its entirety, which is a continuation of U.S. patent application Ser. No. 11/276,079, filed Feb. 13, 2006, now U.S. Pat. No. 7,953,740 and which is related to, but does not claim priority to, U.S. patent application Ser. Nos. 10/966,343 and 10/966,827, both filed on Oct. 15, 2004.

BACKGROUND

1. Field

The present invention is directed to the fields of data mining and query processing, and more specifically, for methods for analyzing behaviors of search engine users to detect associations between particular search strings and items.

2. Description of the Related Art

Many World Wide Web sites permit users to perform searches to identify a small number of interesting items among a much larger domain of items. As an example, several web index sites permit users to search for particular web sites among most of the known web sites. Similarly, many online merchants permit users to search an electronic catalog for particular products. In many cases, users perform searches in order to ultimately find a single item within an entire domain of items.

To perform a search, a user submits a search query, usually in the form of a string of characters with one or more terms. The query may also explicitly or implicitly identify a domain of items to search. For example, a user may submit a query to an online bookseller containing terms that the user believes are words in the title of a book. A query server program processes the query to identify, within the domain, items matching the terms of the query. The items identified by the query server program as matching the search query (and in some cases, as nearly matching the search query) are collectively referred to as the query result. This set of items may be ordered for display in various ways. For example, the list may be ordered based on the extent to which each identified item matches the terms of the query, based on the popularity levels of the responsive items, and/or other criteria.

To improve the relevance of the query results presented to users, some search engine systems monitor and analyze the search-related behaviors of users to detect and quantify associations between particular search strings and items. For example, in the context of a product catalog, if a relatively large percentage of the users who submit the search string "Apple" select an Apple iPod™ Shuffle from the corresponding search results pages, the search engine system may create an association between this search string and product. As another example, in the context of a search engine for searching the World Wide Web, if a relatively large percentage of those who search for "tax return" select the web site "www.irs.gov," an association may be created between this search string and web site.

The detected string/item associations may be used to provide more relevant search results to users by increasing the rankings of the items most closely associated with a user's search string. For instance, in the example above with the search term "Apple," when a user conducts a catalog search for "Apple," the search engine may display the iPod Shuffle item at the top of the search results listing.

Unfortunately, existing methods sometimes fail to accurately detect and quantify behavior-based associations between search strings and items.

SUMMARY

One embodiment of the invention provides an improved system and method for automatically detecting associations between particular sets of search criteria, such as particular search strings, and particular items. In a preferred embodiment, actions of users of a search engine are monitored over time to generate user activity data reflective of searches, item selection actions, and possibly other types of user actions. A correlation analysis component collectively analyzes the user activity data to automatically identify and quantify associations between specific search strings and specific items. As part of this process, different amounts of weight are given to different item selections made by a user following the user's submission of a search string.

Preferably, the amount of weight accorded by the system to a given post-search item selection event, for purposes of quantifying the association between this item selection event and the search string submission, is dependent upon the "distance" (e.g., number of clicks and/or amount of time) between the search string submission and the item selection event. For instance, if a user submits a search string, then views item 1, and then views item 2, the user's selection of item 1 may be given more weight than the user's selection of item 2 for purposes of identifying the items most closely associated with this search string. In this example, it should be noted that items 1 and 2 need not be items that were included in the query result; thus, the process is preferably capable of detecting/quantifying an association between a search string and an item that is not included in the query result of this search string.

The amount of weight given to a particular post-search item selection event may also depend on the type or types of intervening actions performed by the user. For example, in the context of an electronic catalog of an online merchant, if a user submits a search string, then views and purchases item 1, then selects item 2 for viewing, the selection of item 2 may be given very little or no weight in connection with this search string. The low weight accorded to the selection of item 2 in this example is based on the assumption that the user started looking for something unrelated to the search string after purchasing item 1.

The string/item associations detected via these processes may be used in a number of ways, such as to improve the relevance of search results provided to users. For example, a query-result item having a strong behavior-based association with the submitted search string may be displayed at or near the top of the search results listing, or may otherwise be displayed more prominently than other query result items. As another example, an item that falls outside the query result set (because it fails to match the search string), but which has a strong behavior-based association with the search string, may be added to the query result set for purposes of display to the user.

In another embodiment, the disclosed methods are used to more accurately detect and quantify associations between particular search strings and item categories. For instance, in the context of an electronic catalog in which items are arranged by category, the disclosed methods may be used to identify the item categories most closely associated with a particular search string. These top item categories may thereafter be displayed on search results pages for this search string to assist users in locating items by category.

The invention may be used to facilitate searches for any of a variety of different types of items, including but not limited to products represented in an electronic catalog, web sites, web pages, blogs, music files, video files, news articles, journal articles, auctions, images, business listings in an online "yellow pages," documents on a corporate intranet, people, and television shows. The invention can be implemented via computer in conjunction with a wide range of different types of systems that include interactive search functionality, including but not limited to web site systems, online services networks, interactive television systems, and systems that support searching by voice.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

FIG. 5 is a sample web server log that may be used by the engine.

FIG. 6 is a sorted version of the web server log of FIG. 5.

FIG. 7 is a table diagram showing sample contents of a search string/item relationship table typically used by the engine in a state before the engine analyzes the new values of the log of FIGS. 5 and 6.

FIG. 8 is a table diagram showing sample contents of a search string/item relationship table after the engine has analyzed the actions of a user from the log of FIG. 5 but before it has analyzed their decay values.

FIG. 9 is a table diagram showing sample contents of a search string/item relationship table after the engine has analyzed the decay values of FIG. 8.

FIG. 10 is a table diagram showing sample contents of a search string/item relationship table after the engine has analyzed the actions of a second user from the log of FIG. 5 but before it has analyzed the second user's decay values.

FIG. 11 is a table diagram showing sample contents of a search string/item relationship table after the engine has analyzed the decay values of FIG. 10.

FIG. 12 is a table diagram showing sample contents of a search string/item relationship table after the engine has completed analysis of the log from FIG. 5.

DETAILED DESCRIPTION OF SPECIFIC EMBODIMENTS

I. Overview

Figure 1:
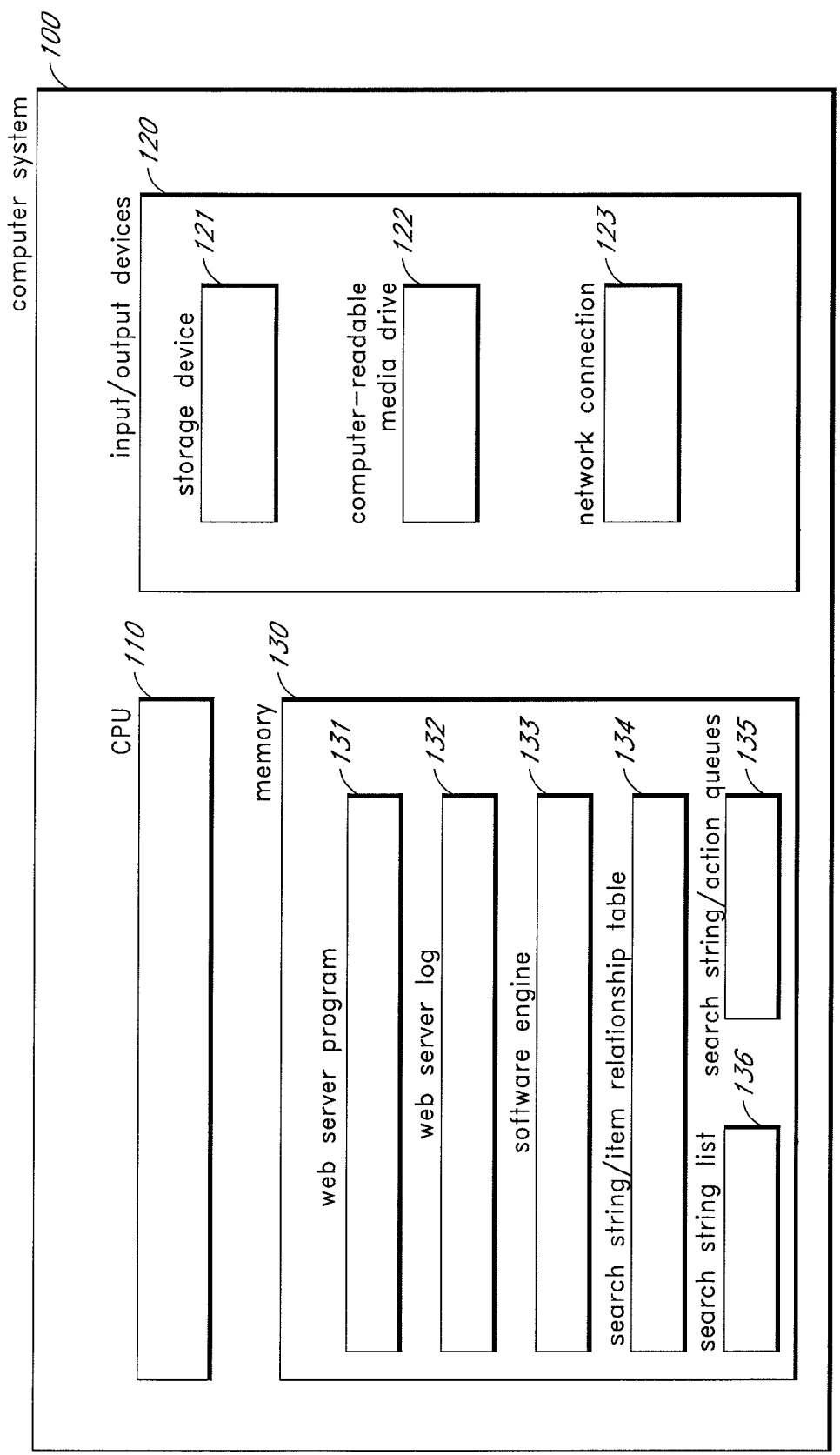
FIG. 1 is a high-level block diagram showing typical components of a computer system or other device upon which the engine executes.

The present invention provides improved computer-implemented methods for detecting and quantifying associations between particular search strings and particular items based on aggregate user activity. The invention may be implemented as part of, or in conjunction with, any type of multi-user interactive system that provides functionality for users to search for and select items stored or represented in a computer-based data repository. The items may, for example, include any one or more of the following: products represented in an electronic catalog, web sites, web pages, blogs, music files, video files, news articles, journal articles, auctions, images, business listings in an online "yellow pages," documents on a corporate intranet, people, and television shows.

The string/item associations detected via the disclosed methods may be used for a variety of different purposes. For example, these associations may be used to augment search results with items that do not match the user's search string, but which have strong behavior-based associations with the search string. The associations may also be used to rank search results for display, such that matching items having the strongest behavior-based associations with the search string tend to be displayed first. The detected associations may also be used to suggest keyword strings to advertisers in the context of an online advertising system in which advertisers can bid on keyword strings; for example, if an advertiser operates a particular web site, the search strings most closely associated with that web site may be suggested to the advertiser.

One aspect of the invention involves giving different amounts of weight to different post-search item selection events in a user's event history or "clickstream," such that item selections that are more distant from the search event are generally given less weight. For example, suppose that the following sequence of events occurs in a user's browsing session:

---

Search for STRING 1
Select item 1 for viewing
Select item 2 for viewing
Search for STRING 2
Select item 3 for viewing

---

In this example, the user's selection of item 2 would be given less weight than the user's selection of item 1, and the user's selection of item 3 would be given less weight than the user's selection of item 2, for purposes of identifying items that are related to STRING 1. Thus, the associations between STRING 1 and each of items 1, 2 and 3 would increase as the result of the user's actions, but with the increase being the greatest for item 1 and the least for item 3. With respect to the search for STRING 2, the user's selections of item 1 and 2 are preferably given no weight since these events occurred before the user conducted the second search.

The actual amounts of weight accorded to a given item selection event may also depend upon the number of intervening user actions, if any, performed between the search and that event. This may be accomplished by assigning decay values to intervening events. For example, if a decay factor of 0.5 is used for each event (including search events), the item selection events may be weighted as follows for purposes of measuring associations with STRING 1:

---

Search for STRING 1
Selection of item 1:    weight = 1.0
Selection of item 2:    weight = 0.5 × 1.0 = 0.5

| | |
|---|---|
| Search for STRING 2 | |
| Selection of item 3: | weight for STRING 1 submission = 0.5 × 0.5 × 0.5 = 0.125; |
| | weight for STRING 2 submission = 1 |

In this example, two different event weights are generated for the selection of item 3. The first weight, 0.125, represents the degree to which this item selection event is associated with the user's submission of STRING 1, and is used in quantifying the degree of association between STRING 1 and item 3. The second weight for the selection of item 3 represents the degree to which this item selection event is associated with the user's submission of STRING 2, and is used in quantifying the degree of association between STRING 2 and item 3. The first of these two event weights (0.125) is relatively low because three intervening events—each with a decay factor of 0.5—occurred between the search for STRING 1 and the selection of item 3.

As discussed below, event weights corresponding to the actions of many different users are typically used in combination to generate, for each string/item pair for which sufficient user activity data exists, a relationship value or score that represents the degree of association between the search string and the item. These relationship values may be updated periodically or continuously to reflect new user activity, and may be used to identify the items that are most closely associated with particular search strings. In general, the greater the weight accorded to a given item selection event in connection with a particular search string submission, the more influence that item selection event will have on the associated string/item relationship value.

The amount of weight accorded to a given item selection event may also depend upon the type or types of the intervening events. For instance, in the example above, a decay factor of 0.7 may alternatively be used for search events, so that an intervening search has a lesser decaying effect than an intervening item selection action. This would cause the user's selection of item 3 to be attributed a weight of 0.5×0.5×0.7=0.175.

Rather than using a fixed decay amount for search events, the decay may be selected based on some measure of the relationship between the two search strings. For instance, in the example above, suppose that STRING 1="apple mp3 player" and STRING 2="apple music player." Because these two search strings are closely related, a larger decay factor (e.g., 0.9 or 1.0) may be used for the second search, such that greater weight is given to the selection of item 3 than if a search decay of 0.7 is used. This greater weight would be justified since the user apparently merely refined the original search rather than moving on to a new search task. If, on the other hand, the user submitted a highly unrelated search string as STRING 2, such as "tax preparation," a lower decay factor may be selected for the second search, such as 0.2 or 0.3. The degree of relationship between the two search strings may be measured in a variety of different ways for purposes of assigning a decay factor to the second search event. One such method involves calculating the edit distance (i.e., the number of additions, deletions, and transpositions of letters) between STRING 1 and STRING 2. If the edit distance is small relative to the lengths of STRING 1 and STRING 2, the two strings may be treated as related, and a relatively high decay factor may be used. If the edit distance is relatively large, a relatively small decay factor may be used.

Another method, which may be used in combination with the edit distance method, involves comparing STRING 1 and STRING 2 on a term-by-term basis to evaluate whether the two strings have similar meanings. For example, the search strings "mp3 player" and "ipod" may be treated as related—despite the large edit distance between these two strings—because both "mp3" and "player" are related to the term "ipod." To implement this feature, a table that maps terms to related terms may be used. This table may, for example, be generated by analyzing search query submissions of a large number of users to identify terms that tend to frequently co-occur in search queries, as described in U.S. Pat. No. 6,853,993, the disclosure of which is hereby incorporated by reference.

In embodiments in which different types of item selection events can occur (e.g., view, purchase, add to shopping cart, add to rental queue, submit review, submit bid, etc.), the weight given to a particular item selection event may also depend on the type of that event. For example, in the context of an electronic catalog of an online merchant, product viewing events may be given a pre-decay weight of one, "shopping cart add" events may be given a pre-decay weight of five, and item purchases may be given a pre-decay weight of ten. Thus, for example, if a user performs the following sequence of events, the event weights may be calculated as shown.

| |
|---|
| Search for STRING 1 |
| View item 1: weight = 1.0 |
| View item 2: weight = 1.0 × 0.5 = 0.5 |
| Purchase item 3: weight = 10 × 0.5 × 0.5 = 2.5. |

In this example, the user's actions tend to strengthen item 3's association with STRING 1 the most, even though the user did not select item 3 until after selecting items 1 and item 2. This is because purchase events in this example have a greater association-creating capacity than item viewing events. It should be noted in this example that the user may have viewed item 3 and added it to a shopping cart immediately prior to the purchase, but that these events are treated as being subsumed by the subsequent purchase of item 3.

In some embodiments, the amount of time that passes between the search event and an item selection event may also be taken into consideration in determining how to weight the item selection event. For instance, for each hour of time that passes between the search event and the item selection event, the event weight may be halved. Thus, if the purchase of item 3 in the immediately preceding example occurred between two and three hours after the search for STRING 1, the weight accorded to this purchase may be reduced to 0.625. Item selection actions occurring more than some maximum amount of time after the search, such as 12 or 24 hours, may be disregarded in connection with the search.

Although the examples above do not distinguish between single-term and multi-term search strings, multi-term search queries may, in some embodiments, be parsed into their individual terms for purposes assessing string/item associations. For instance, if a user performs the following sequence of actions:

| |
|---|
| Search for "mp3 player" |
| Select browse node |
| Select item 1 | the event weight assigned to the user's selection of item 1 may additionally be used in calculating (1) the degree of association between the term "mp3" and item 1, and (2) the degree of association between the term "player" and item 1.

The event weighting methods described herein may also be used to assess associations between more generalized sets of search criteria and particular items. For instance, the event weighting methods may be used to quantify the degree of association between particular field-limited search queries of the form FIELD=STRING and particular items, where FIELD is a user-specified field restrictor such as "title" or "author."

Finally, the disclosed event weighting methods may be used to more accurately assess associations between particular search strings (or more generalized sets of search criteria) and particular item categories. For example, as described in U.S. Pat. Pub. 2005/0222987, the disclosure of which is hereby incorporated by reference, each item selection action performed by a user may be treated as a selection of the item category or categories in which that item falls for purposes of measuring associations between search strings and item categories. By using the item selection weights calculated as disclosed herein as category selection weights, these associations may be assessed more reliably.

The various methods described above may be embodied in, and fully automated by, software executed by one or more general purpose computers. The software, and the string/item association data generated via execution of the software, may be stored in any appropriate type or types of computer storage.

II. Example Implementation Involving Web-Based Electronic Catalog

A particular embodiment of the invention will now be described with reference to the drawings. In this embodiment, a software-based engine analyzes actions performed by users of a web-based catalog of items that are available for purchase and/or rent, and uses the identified string/item associations to augment and/or prioritize search results. The catalog is hosted by a server system that implements a catalog search engine for conducting keyword-based searches for catalog items. The server system also provides functionality for users to browse the electronic catalog via a browse tree in which catalog items are arranged within a hierarchy of item categories. As will be recognized, this embodiment represents one of many possible implementations of, and applications for, the event weighting methods disclosed herein.

For a group of users, the engine monitors and records search queries submitted and item selection actions performed. The item selection actions may, for example, include viewing an item's item detail page in the catalog, adding an item to a shopping cart or rental queue, adding an item to a gift registry, ordering an item, sampling an item, or rating or reviewing an item. For each item selection action by a user, the engine (1) identifies queries submitted by that same user before the selection action, and (2) correlates the item that is the subject of the selection action with the search string. Furthermore, the engine assigns a decay value for each of the queries submitted and item selection actions taken in order to calculate string/item relationship values representing the degree of association between particular search strings and items. The relationship value for a given search string/item pair may, for example, be calculated as a probability that a user who submits the search string will go on to select the item.

When a new query is received, the engine exploits these search string/item relationship values to provide more relevant search results to users. For example, the engine may supplement the query result with one or more items having strong behavior-based associations with the submitted search string, and/or may prioritize items already present in the query result. For example, if a user submits the query "Apple," the engine may do one or both of the following: (1) supplement the query result with items that do not include the term "Apple," but which are commonly selected by users who conduct searches for "Apple," (2) rank query result or supplemented query result items for display such that those with the highest relationship values for "Apple" tend to be listed first.

Where a user has submitted a query containing a query for a first item that is commonly purchased—or otherwise selected—together with a second, "complement" item, the engine can add the complement item to the search result produced for the query. For example, where a user submits a query that identifies a particular printer item that is often purchased together with a particular printer cable item, the engine can add the printer cable item to the produced search result. Additionally, where a number of users use the same search strings to search for a first item, then follow a "related items" link on the first item's item detail page to a second item, the engine can add the second item to the search result. For example, where users commonly (1) submit the query "Apple iPod" to locate the Apple 20-GB iPod music player item, then (2) follow a "related items" link on that item's item detail page to the item detail page for the Monster Cable iCable, the engine can add the Monster Cable iCable item to the search results generated for subsequent "Apple iPod" queries.

By compiling and/or exploiting the search string/item association values in some or all of the ways described above, the engine can assist users by leveraging the earlier experiences and actions of some or all other users. In particular, where other users have had to expend a larger amount of effort to select an item not initially included or prioritized with the query result that they received, a user that receives the enhanced search result produced by the engine that prioritizes the item can select the item from the enhanced search result and avoid any additional effort.

FIG. 1 is a high-level block diagram showing typical components of a computer system or other device upon which the engine executes. The computer system 100 is one of a number of computer systems that collectively host a web site. The web site provides functionality for users to interactively search and browse an electronic catalog of items, to add items to a shopping cart, and to purchase specific items.

As shown in FIG. 1, the computer system 100 comprises one or more central processing units (CPUs) 110, input/output devices 120, and a computer memory (memory) 130. Among the input/output devices is a storage device 121, such as a hard disk drive; a computer-readable media drive 122; and a network connection 123 for connecting the computer system 100 to other computer systems (not shown). The memory 130 contains a web server program 131 for receiving HTTP requests for a merchant or other publisher's website, including search query requests and selection action requests; a web server log 132 in which the web server logs as events the HTTP requests it receives; the software engine 133; a search string/item relationship table 134 generated by the engine from the web server log; search string/action queues 135; and a search string list 136 used by the engine in order to generate the search string/item relationship table. The search string/item relationship table 134 may map many hundreds of thousands or millions of different search strings (terms and/or phrases) to corresponding items, and may include corresponding string/item relationship scores. While the engine 133 may be implemented on a computer system or other device configured as described above, those skilled in the art will recognize that it may also be implemented on computer systems and devices having different configurations.

The components 131-136 shown in FIG. 1 as being stored in the memory 130 may, of course, be distributed across a number of different physical servers of the web site system. The web site system may also include a variety of other components and services for performing various other functions, such as, for example, dynamically generating requested web pages, storing and updating catalog data associated with particular items, maintaining user account information, and processing user-initiated transactions. Examples of types of components that may be included in the web site system are provided in U.S. Pat. Pub. 2005/0222987.

Figure 3:
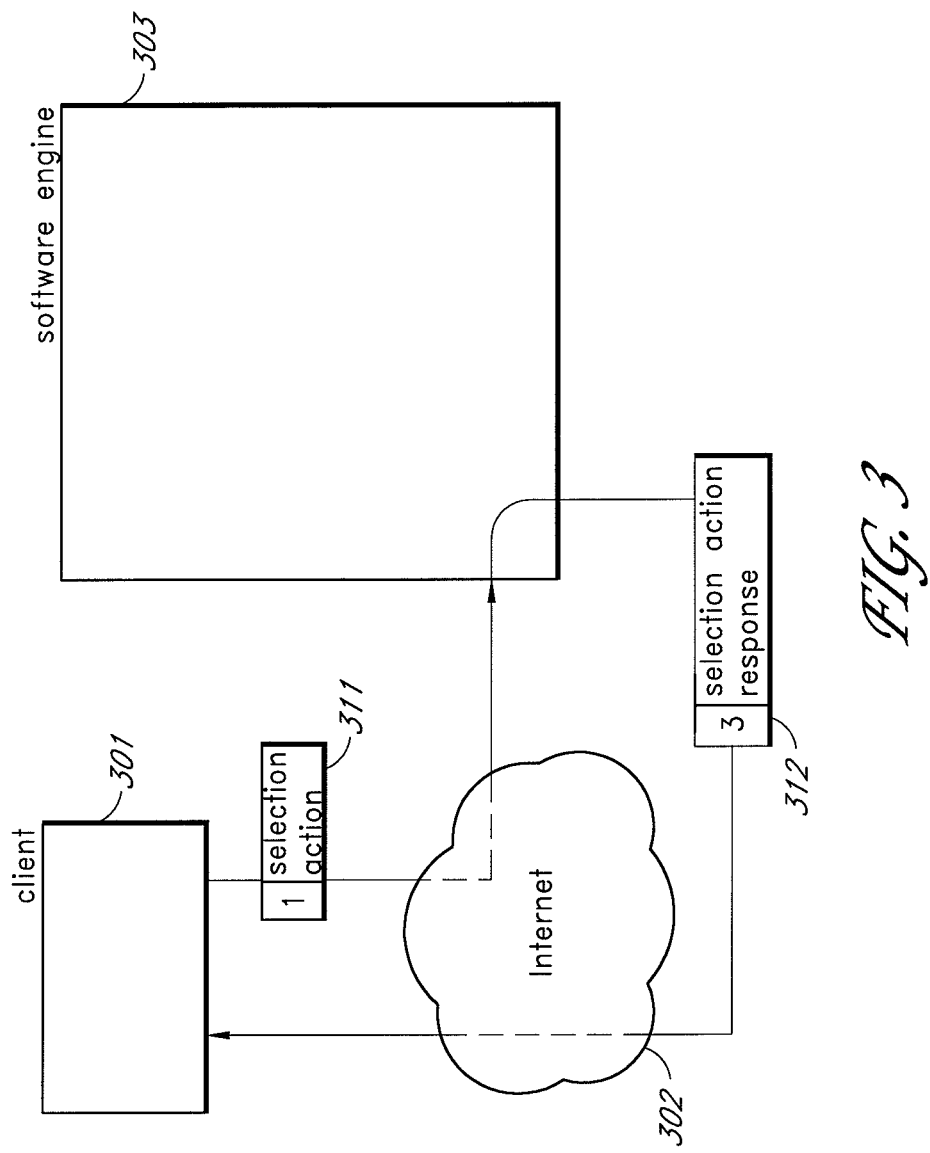
FIG. 3 is a data flow diagram showing data flow relating to the performance of a selection action by a client.
Figures 2, 4:
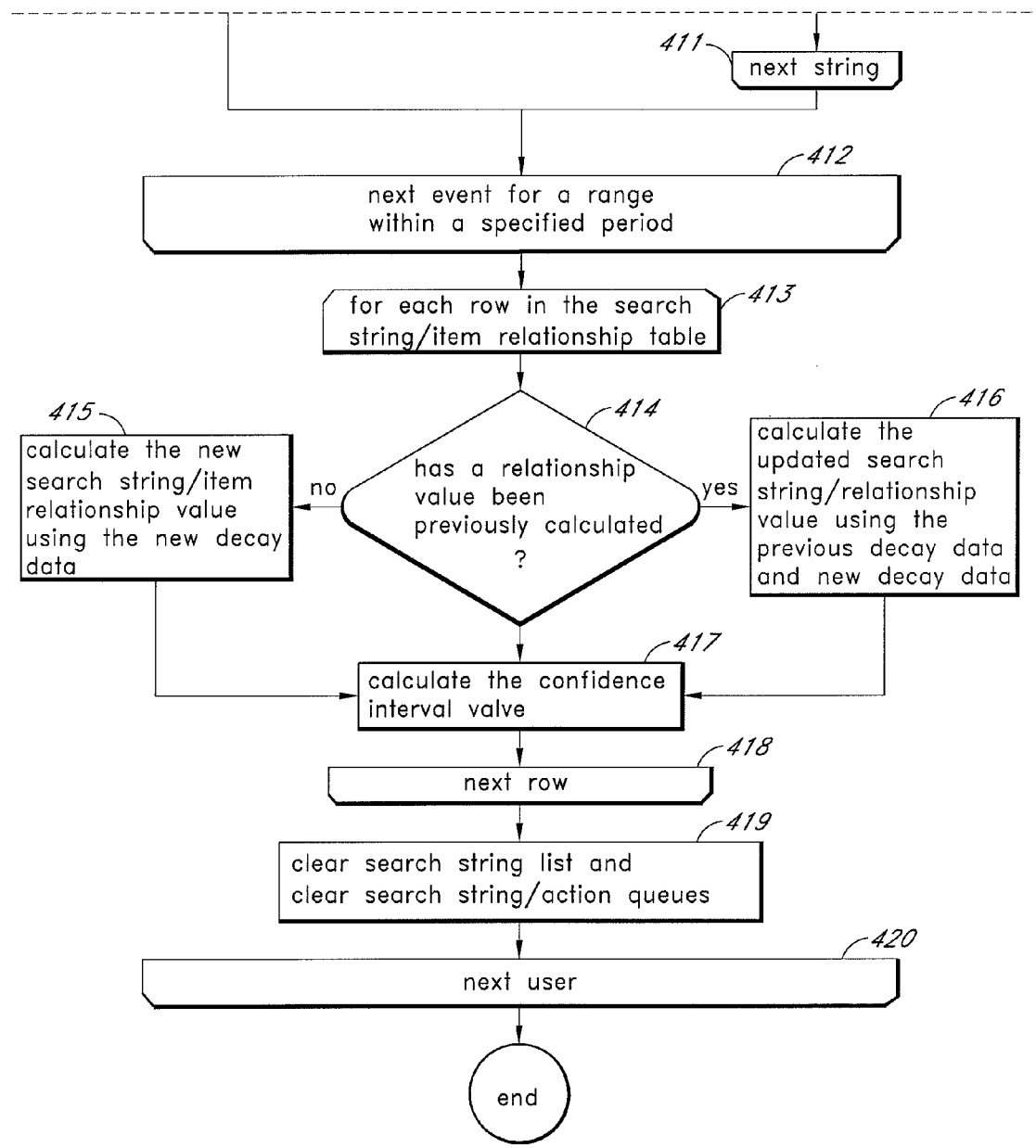
FIG. 2 is a data flow diagram showing data flow relating to a query submitted by a client.
FIG. 4 is a data flow diagram showing data flow relating to generating search string/item relationship values.

FIGS. 2 and 3 are data flow diagrams showing typical data flows produced by the engine. FIG. 2 is a data flow diagram showing data flow relating to a search query submitted by a user/client. FIG. 2 shows that a client 201 submits a query 211 to the software engine 203. In response to receiving the query, the engine sends two retrieval requests 212 and 214, as described below. The engine 203 sends a retrieval request 212 to a search index 204, which returns a search result 213 based upon the contents of the search index. The engine also sends a retrieval request 214 to the search string/item relationship table 205, which returns high scoring items for the terms in the query 215. When the engine receives items 213 and 215, it sends an enhanced query result 216 via the Internet to the client.

FIG. 3 is a data flow diagram showing data flow relating to the performance of a selection action by a user/client. FIG. 3 shows a selection action 311 sent from a client 301 to the software engine 303. In response to receiving the selection action, the engine sends a selection action response 312 via the Internet 302 to the client.

Those skilled in the art will appreciate that queries submitted as shown in FIG. 2 and selection actions submitted as shown in FIG. 3 may be submitted by various programs executing on the client computing device 201 in various ways. For example, either or both may be submitted by a web browser program at the direct instigation of a human user and received by a web server. Where queries and/or selection actions are submitted in this way, an IP address of the client 201 or the value of a cookie stored on the client may be used as the user ID used to correlate search query events and item selection events to generate search string/item relationship values. Alternatively, various other kinds of programs executing on the client may submit queries and/or selection actions, which may be received by various kinds of programs on behalf of the software engine 203. For example, the query and/or selection action may be submitted and received as web services requests. Where this is true, the engine may use the client's IP address or a requester ID submitted in the web services request to correlate queries with selection actions.

The engine 203 assigns decay values to particular actions performed by a user following a search query submission. As explained below, these decay values are used to determine how much weight to give to particular item selection events for purposes of quantifying the associations between particular search strings and particular items.

FIG. 4 is a flow diagram showing steps typically performed by the engine to generate search string/item relationship values from event data descriptive of particular user actions. The engine typically performs these steps periodically as HTTP requests are received by the web server and logged as events in the web server log. A new web log may be started on an hourly, daily, weekly, or other periodic basis such that different web logs correspond to different time period. The engine may accord lesser weight to search string/item relationship values calculated from older web server logs as it obtains data from newer web logs, such that greater weight is given to recent user activity data. For example, the engine may reduce by decay the total number of search queries conducted with a relationship based on the amount of time that has transpired since those searches occurred. Although the particular embodiment described herein uses web logs to record and analyze the event data, the event data may be recorded using other types and formats of data repositories, including event history databases and servers of the type described in U.S. Pat. Pub. 2005/0033803.

FIGS. 5-12 will be used to illustrate a simple example of how the process shown in FIG. 4 may be applied to a set of events represented in a web log. FIG. 5 is a sample web server log, and FIG. 6 is a sorted version of that log. The log is made up of rows, such as rows 501-513. Those skilled in the art would appreciate that a typical web server log would contain a much larger number of rows than shown in FIG. 5. Each row in the table corresponds to a different user action logged by the web server, and is divided into the following columns: a user ID column 514 containing a user ID identifying the user from whom the event was received; a time column 515 indicating the time at which the event was received; an action type column 516 listing the type of action performed by the user; an item column 517 containing the item number that was associated with the user's action; and a description column 518 containing a brief description of the item selected. For example, contents of row 501 indicate that, at 11:01:09 a.m., a "view item" request was received by a user having user ID "A" for item 28834584, an Apple Desktop. To facilitate the understanding and viewing of FIGS. 5 and 6, the rows that correspond to a particular user, user B, are shaded in order to distinguish user B's actions from user A's actions. In some embodiments, the engine may treat each search term of a multi-term search query as a separate search string for purposes of performing the analysis described herein.

FIG. 7 is a table diagram showing sample contents of a search string/item relationship table typically created, maintained and used by the process shown in FIG. 4. The search string/item relationship table 700 is made up of rows, such as rows 701-707. A typical search string/item relationship table would contain a much larger number of rows than shown in FIG. 7. Each row corresponds to a search string/item pair encountered in the web server log, and is divided into the following columns: the string submitted to the engine 708; the item 709 that has previously been associated with the string; item selection and search actions 710 that are used to process search string/item relationship values; the current value 711 assigned to the search string/item pair; the number of search queries 712 that have been previously conducted for the search string/item pair; and the current confidence interval value assigned to the search string/item pair 713. For example, the contents of row 707 indicate that the relationship value for the search string "Spiderman" and item 65488210 is 0.81, that this string/item pair has occurred in seven hundred and eighty six previous event histories, and that the confidence interval value of that pair is 0.80. Confidence interval values are mathematical descriptions of how likely it is that others will have the same result as the users in the original sample. They are worthy of use here due to this potential of the sample size of behavior being small; consequently, confidence intervals, which are estimated ranges of values with a high known probability of covering the true population value, may be used. Furthermore, according to the decay values and equations used in the preferred embodiments, confidence interval values are never greater than the value of the search string/item relationship Based upon the values shown in rows 707 and 702, it can be seen that the term "Spiderman" is significantly more related to item 65488210 than is the term "Apple." The search string/item relationship data table may include all of the above listed columns in one data structure, or may use multiple distinct data structures to store the data.

FIGS. 8-12 show how the table of FIG. 7 is updated by the engine 203 during different steps of the process shown in FIG. 4. FIG. 7 shows the search string/item relationship table before the engine begins processing the data. FIG. 8 shows the search string/item relationship table after the engine processes the data from user A but before it updates the relationship values. FIG. 9 shows the search string/item relationship table after the engine completes with user A. FIG. 10 shows the search string/item relationship table after the engine processes the data for user B from the web server log, but before it updates the relationship values. FIG. 11 shows the search string/item relationship table after the engine completes with user B. FIG. 12 shows the search string/item relationship table after the engine has completed processing the web server log of FIG. 5.

Returning to FIG. 4, in step 401, the engine sorts the web server log first by user, then by the time of that user's actions. The sample table of FIG. 5 is shown sorted in FIG. 6 as a result of step 401. In step 402, the engine processes the web server log one user at a time. According to the sample web server log of FIGS. 5 and 6, the engine would first update search string/item relationship values using the data collected from user A 601, and then from user B 602. In step 403, the engine loops through the sorted web server log until it encounters the first search submitted by the user. For example, in the web server log of FIG. 6, the engine skips A's view action of the Apple Desktop item (603 in FIG. 6) to reach A's search request for "Apple" (604 in FIG. 6). After reaching the first search event, the engine sequentially works through the sorted web log, as shown in step 404. For each event in the sorted web server log, the engine branches on the event type of the event as shown in step 405: if the event is a search event, then the engine continues in step 406; if the event is an item selection event, then the engine continues in steps 407-410.

In step 406, if the engine encounters a search event, it adds the string submitted in the query to the search string list (136 in FIG. 1) and adds the search action to all previously existing search string/action queues (135 in FIG. 1). For example, after the engine encounters user A's search for "Apple" 604 in the sorted web server log, it adds the string "Apple" to the search string list. It will not add the search action to any action queues because none exist at that time since no previous searches have occurred in the sorted web server log.

If the engine encounters an item selection event, it firsts add the item selection action to each search string/action queue as shown in step 407. For example, using the data from the sorted web server log of FIG. 6, the first item selection action is A's viewing of item 45645549, an Apple iPod Shuffle 605. The engine first adds the view action to all existing search string/action queues, which in the example would only be the "Apple" action queue. Returning to FIG. 4, in step 408, the engine then proceeds sequentially through each string in the search string list (136 in FIG. 1). In step 409, the engine adds a new row to the search string/item relationship table for the search string/item pair if that relationship does not already exist. In the example search string/item relationship table of FIG. 7, the row for the "Apple"/45645549 search string/item pair 704 already exists; thus, as reflected in FIG. 8, the same row 801 exists after the engine has processed A's viewing of item 45645549 after searching for "Apple."

Returning to step 410 in FIG. 4, if the item of the item selection event is different from the item of the previous action in the log, the engine adds all of the actions from the corresponding search string/action queue to the corresponding actions column in the search string/item relationship table and increments the number of searches that have occurred for that search string/item pair. Since user A's previous action was a search (604 in FIG. 6), the engine 203 adds all actions from the "Apple"/action queue, but in this case none exists. The number of searches for the "Apple"/45645549 relationship is nonetheless incremented (802 in FIG. 8). If, however, the current item in the item selection action being processed by the engine is the same as the previous item processed, then the engine performs an action consolidation. The action consolidation consists of removing the second to last action item from each search string/action queue and leaving the number of searches the same. For example, in FIG. 6, when user A first views item 87142324, the Apple iPod (row 606), then adds the item to his cart (row 607), the engine removes A's view action of item 87142324 from the "Apple"/action queue. Consequently, as the engine proceeds further down to process A's following actions, A's view and cart add of item 87142324 will appear only as a cart add. Returning to step 411 of FIG. 4, if any additional strings remain in the search string list, the engine returns to step 408.

In step 412 of FIG. 4, if additional events in the web server log for the current user remain to be processed, then the engine continues at step 404 to process the next event; otherwise the engine continues in step 413. The engine may thus proceed through the example web server log of FIG. 5 and the example search string/item relationship table of FIG. 7 to process each event by user A and end up with the fully populated search string/item relationship table of FIG. 8 with the number of searches conducted for each search string/item relationship updated.

Next, in step 413 of FIG. 4 the engine processes the search string/item relationship values and confidence interval values one row of the search string/item relationship table at a time. For each row in the table, the engine branches on whether or not a relationship value has been previously calculated for the search string/item pair 414.

If a relationship value does not currently exist for a search string/item pair, the engine calculates the new relationship value in step 415 and the new confidence interval value in step 417 based on the decay values associated with the user's actions. If, however, a previous value does exist, the engine updates the value in step 416 using the previous data stored in the search string/item relationship value table and the new data of the decay values associated with the user's actions from the web server log. It then proceeds to update the confidence interval value in step 417. For example, the initial values for the search string/item relationship value and confidence interval value of the "Apple"/12234208 pair were 0 and 0, respectively (row 701 in FIG. 7), since no previous searches for the pair had been run. The engine uses the actions from the action column of row 803 in FIG. 8, as well as the updated number of searches conducted for that pair, to calculate the updated search string/item relationship value of 0.32 and confidence interval value of 0.11 (903 and 904 in FIG. 9). These calculations are discussed below.

In step 418, if additional rows for the user in the search string/item relationship table remain to be processed, then the engine continues at step 413 to process the next row; otherwise the engine continues in step 419. In step 419, the engine clears the search string list (136 in FIG. 1) and search string/action queues (135 in FIG. 1) so that it may process the data of the next user in step 420 by returning to step 402. If no additional users have data left to be processed, the engine completes the process of determining and updating search string/item relationship values.

In this embodiment, the amount of weight given to an item selection event depends upon the number of other actions that occurred between the query submission and the item selection. For example, the engine may assign a decay value of 0.9 to a view action, 0.7 to a cart add action, 0.5 to a search action, and 0 to a purchase action. Since the values are decay values, the decay is applied to an initial value of 1. Lower decay values cause the user's post-query-submission event history to be decayed faster, such that less weight is given to item selection events that are farther away from the query submission. For example, if a user submits a search query, then purchases item 1, then views item 2, the viewing of item 2 will be given no weight in connection with this search query submission. This is because the decay of zero used for purchase actions causes the event history to fully decay. Of course, a non-zero decay could alternatively be used for purchase actions.

As can be seen in row 901 of FIG. 9, user A's actions on the "Apple"/12234208 search string/item relationship pair are a view, cart add, and a search. Using the example decay values provided above, the value assigned to user A's new behavior for the "Apple"/12234208 search string/item relationship pair 902 is 1*0.9*0.7*0.5, which equals 0.32. Since neither a previous search string/item relationship value nor a confidence interval value for the pair existed due to the fact that no searches had been conducted for that relationship (row 701 in FIG. 7), the new search string/item relationship value of 0.32 based on User A's actions now becomes the current value for the pair 903. After the search-string item relationship value is updated to reflect user A's behavior, the confidence interval value of the "Apple"/12234208 search string/item relationship pair 904 will also be updated. In other instances, where a previous search string/item relationship value exists, new data based on recent behavior is incorporated into the previous search string/item relationship value of the pair. In the preferred embodiment, the search string/item relationship value for a pair is $p=A/K$, where:

A=Sum of all previous search string/item relationship values for each search string/item relationship K=Total number of searches for the search string/item relationship As explained in the preceding subsection, various other types of criteria can additionally be used in determining how much weight to give to particular item selection actions. For example, the amount of time between the search and the item selection action may be considered. As another example, the degree of relationship between the initial search string and the intervening search string may be considered for purposes of selecting the decay factor to assign to the second search.

Confidence interval values are a valuable way to account for the sample size of user event data relevant to a given string/item relationship value. Search string/item relationship values are less reliable when the sample size is small. For example, according to the search string/item relationship equation above ($p=A/K$), the search string/item relationship value will be the same in all of the following instances: 10 customers search for X and 1 person purchases Y, 1,000 customers search for X and 100 people purchase Y, 100,000 customers search for X and 10,000 people purchase Y. In each of these scenarios, if the search/string item relationship value of $p=A/K$ is used, there is always a 10% probability that someone will purchase Y. It is however much more likely that a probability of 10% is more accurate after having observed 100,000 people than just 10 people. Consequently, in a predictive system that uses observational behavior such as certain embodiments described herein, a value which accounts for low data is generally more reliable than the search string/item relationship value. In the preferred embodiment, the confidence interval value is equal to $p-A_i*\sqrt{(p*(1-p)/(n+k))}$, where:

$p=A/(K+k)$ $A_i$=a constant to increase or decrease the confidence interval, such as 1 n=total number of searches for that search string k=a constant to penalize search strings that have few searches, such as 4.

Figure 13:
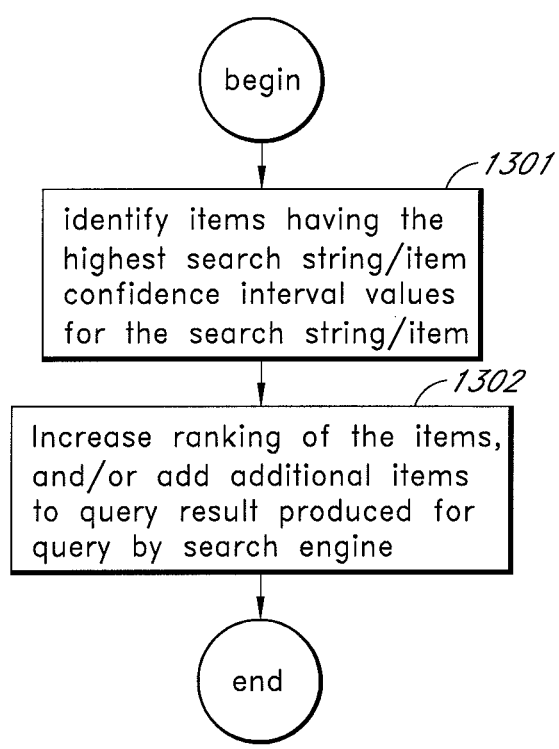
FIG. 13 is a flow diagram showing steps typically performed by the engine in order to enhance a query result produced by a search query for a particular search string.

FIG. 13 is a flow diagram showing how the engine can exploit search string/item relationship values. FIG. 13 shows steps typically performed by the engine in order to augment a query result produced by a standard search for a particular search string. In step 1301, the engine identifies items having the highest search string/item relationship values for the term or terms in a query. In the illustrated embodiment, the engine would use the confidence interval value of each search string/item pair, while in another embodiment the engine may use the search string/item relationship value. In step 1302, the engine increases the rank of items or adds additional items from the items identified in step 1301 to the query result produced for the query by the standard search engine. In step 1302, the engine can either combine the items identified in step 1301 seamlessly into the list of items already in the query result, or may insert a distinct list of the identified items that is visually separated from the list of items produced by the standard search. A cut-off value may be used such that only those items whose string/item relationships exceed some threshold are added to the query result. For example, the engine would use a cutoff confidence interval value of 0.00000001.

The engine may also prevent the query result from being augmented with an item whose relatively high string/item relationship value is likely attributable primarily to the high popularity level of this item generally, as opposed to a strong relationship between the item and the search string. This form of filtering may be accomplished by, for example, blocking the query result from being augmented with any item whose selection frequency is more than M times the average item selection frequency across all items, where M is a selected value such as 15.

For some queries, the standard search may produce an empty query result, in which case the augmented query result produced in step 1302 contains only items identified based on their search string/item relationship values. In some embodiments, the engine includes certain related information with each item it adds to the query result, such as, for example, a link to the item detail page for the item; an image related to the item; catalog text associated with the item; the item's price; the item's level of availability; controls for purchasing the item, adding it to a wish list, or performing other selection actions; etc. After step 1302, the steps conclude.

All of the methods and processes described above may be embodied in software code modules executed by one or more general purpose computers. The code modules may be stored in any type of computer-readable medium or storage device. Some or all of the methods may alternatively be embodied in specialized computer hardware.

It will be appreciated by those skilled in the art that the above-described engine may be straightforwardly adapted or extended in various ways. While the foregoing description makes reference to particular embodiments, the scope of the invention is defined solely by the claims that follow and the elements recited therein.

What is claimed is:

1. A computer-implemented method of determining a degree of association between a search string and an item, the computer-implemented method comprising:

as implemented by one or more computing devices configured with specific executable instructions, retrieving a user event history sequence that identifies a number of user actions that occurred during user interaction with an electronic repository, wherein the user event history sequence comprises a search event in which the user submitted a request to search items in the electronic repository;

identifying a search string submitted by the user in association with the search event;

identifying a subsequent item selection event in the user event history sequence, wherein the subsequent item selection event corresponds to a selection by the user of an item in the electronic repository, said subsequent item selection event occurring after the search event;

determining a number of intervening events in the user event history sequence that each occur after the search event and before the subsequent item selection event; and calculating a relationship value representing a probability that a user who submits the search string will subsequently select the item, wherein the relationship value is calculated based at least in part on the determined number of intervening events that occur after the search event and before the subsequent item selection event in the user event history sequence.

2. The computer-implemented method of claim 1, wherein the relationship value is calculated based at least in part on a plurality of user event history sequences associated with the search string.

3. The computer-implemented method of claim 2, wherein the plurality of user event history sequences comprises a user event history sequence corresponding to a different user.

4. The computer-implemented method of claim 1, wherein the relationship value is calculated based at least in part on a type of intervening event that occurred after the search event and before the subsequent item selection event.

5. The computer-implemented method of claim 1, wherein each intervening event serves to reduce an amount of weight given to the item selection event for purposes of calculating the relationship value.

6. The computer-implemented method of claim 1, wherein at least one of the intervening events includes a second search event, and wherein calculating the relationship value comprises taking into consideration a degree to which respective search strings of the search event and the second search event are related.

7. The computer-implemented method of claim 1, wherein the relationship value is calculated based at least in part on an amount of time that passed between the search event and the subsequent item selection event.

8. The computer-implemented method of claim 1, wherein the item is a product represented in an electronic catalog.

9. The computer-implemented method of claim 1, wherein the item is a category of products represented in an electronic catalog.

10. A system for determining a degree of association between a search string and an item, the system comprising:

a data store configured to store user event history sequences that identify a number of user actions that occurred during user interaction with an electronic repository, wherein at least one of the user event history sequences comprises a search event in which a user submitted a request to search items in the electronic repository; and a computing device in communication with the data store, the computing device configured to:

retrieve the at least one user event history sequence from the data store, wherein the at least one user event history sequence includes a search string submitted by the user in association with the search event and a subsequent item selection event, wherein the subsequent item selection event corresponds to a selection by the user of an item in the electronic repository, said subsequent item selection event occurring after the search event;

determine a number of intervening events in the at least one user event history sequence that each occur after the search event and before the subsequent item selection event; and calculate an event weight that specifies an amount of weight to give to the item selection event for purposes of quantifying an association between the search string submitted by the user and the item selected in the subsequent item selection event, wherein the event weight is calculated based at least in part on the determined number of intervening events that occur after the search event and before the subsequent item selection event in the at least one user event history sequence; and based at least in part on the event weight, determine a relationship value representing a probability that a user who submits the search string will subsequently select the item.

11. The system of claim 10, wherein the relationship value is further determined based at least in part on event weights calculated for other item selection events associated with the item and the search string.

12. The system of claim 10, wherein, when the intervening events include an intervening search event, the event weight is calculated based at least in part on a degree of association between the search string and a second search string submitted in the intervening search event.

13. The system of claim 10, wherein the event weight is calculated based at least in part on an amount of time between the search event and the item selection event.

14. The system of claim 10, wherein the event weight is calculated based at least in part on an event type of at least one of the intervening events.

15. The system of claim 10, wherein the items are products represented in an electronic catalog.

16. The system of claim 10, wherein the items are web sites accessed via a search engine.

17. A non-transitory computer-readable medium comprising computer-executable components for determining a degree of association between a search string and an item, the computer-executable components comprising:

an identification component that identifies a user event history sequence that identifies a number of user actions that occurred during user interaction with an electronic repository, wherein the user event history sequence comprises:

a search event in which the user submitted a request to search items in the electronic repository, the search event associated with a search string submitted by the user in association with the search event;

a subsequent item selection event corresponding to a selection by the user of an item in the electronic repository, said subsequent item selection event occurring after the search event; and a number of intervening events in the user event history sequence that each occur after the search event and before the subsequent item selection event; and a calculation component that calculates a relationship value representing a probability that a user who submits the search string will subsequently select the item, wherein the relationship value is calculated based at least in part on the number of intervening events that occur after the search event and before the subsequent item selection event in the user event history sequence.

18. The non-transitory computer-readable medium of claim 17, wherein the relationship value is calculated based at least in part on a plurality of user event history sequences associated with the search string.

19. The non-transitory computer-readable medium of claim 17, further comprising a search engine component that uses the relationship value to determine whether to augment a query result set with the item.

20. The non-transitory computer-readable medium of claim 19, wherein the search engine component inhibits the item from being added to the query result set if a popularity level of the item exceeds a threshold.

* * * * *